United States Patent [19]
Rooklyn

[11] Patent Number: 4,988,419
[45] Date of Patent: Jan. 29, 1991

[54] METHOD AND APPARATUS FOR PRODUCING CONDUCTIVITY IN MATERIALS

[75] Inventor: Jack Rooklyn, Northridge, Calif.

[73] Assignee: Industrial Management Co., North Hollywood, Calif.

[21] Appl. No.: 146,089

[22] Filed: Jan. 20, 1988

[51] Int. Cl.⁵ .......... B29C 71/04
[52] U.S. Cl. .......... 204/157.42; 204/157.62; 204/193; 204/130; 204/157.15; 310/367; 310/369; 310/370; 310/334; 422/127; 422/128; 264/340
[58] Field of Search .......... 310/367, 369, 370, 334; 204/193, 157.42, 157.62, 134, 157.15; 422/127, 128; 264/340

[56] References Cited

U.S. PATENT DOCUMENTS

| | | | |
|---|---|---|---|
| 1,939,712 | 8/1930 | Mahoux | 204/157.42 |
| 2,876,083 | 3/1959 | Prietl | 204/157.42 |
| 3,313,962 | 4/1963 | Sonderegger | 310/367 |
| 3,346,472 | 9/1963 | Long | 204/157.62 |
| 3,351,539 | 11/1967 | Branson | 204/157.42 |
| 3,481,687 | 12/1969 | Fishman | 422/128 |
| 4,168,295 | 9/1979 | Sawyer | 204/193 |
| 4,547,691 | 10/1985 | Valdois | 310/369 |
| 4,561,953 | 12/1985 | Muralidhara | 204/157.42 |

FOREIGN PATENT DOCUMENTS

| | | | |
|---|---|---|---|
| 751735 | 7/1956 | United Kingdom | 204/157.42 |

*Primary Examiner*—John F. Niebling
*Assistant Examiner*—David G. Ryser
*Attorney, Agent, or Firm*—Poms, Smith, Lande & Rose

[57] ABSTRACT

A method or process for treating materials for making materials electrically conductive that are not naturally electrically conductive or for increasing and enhancing the electrical conductivity of materials that are naturally electrically conductive. The invention is carried out in processing apparatus or equipment. The apparatus includes a vessel containing a solution that is electrically conductive. The solution or bath contains salts including acid surfactant, acid and silver nitrate crystals. The apparatus includes electrical equipment which includes electrodes exposed to the solution in the vessel so that an alternating electrical current is caused to traverse the solution and the material being processed. Additionally, the apparatus includes an array of ultrasonic generators provided to cause ultrasonic sound vibrations to traverse through the solution and the material being processed simultaneously with the flow of current. The material is processed by being immersed in the solution while the flow of current through the solution and the material is produced simultaneously with the transmission of ultrasonic vibrations through the solution and the material to be processed. Continuous filtering and recirculation of the solution in the vessel is provided for.

32 Claims, 3 Drawing Sheets

METHOD AND APPARATUS FOR PRODUCING CONDUCTIVITY IN MATERIALS

BACKGROUND OF THE INVENTION

1. Field of the Invention

The field of this invention is that of static dissipative materials, that is, dissipation of static charge from materials. The field embraces not only static dissipative materials but includes the concept and implementation of the concept of increasing the electrical conductivity of materials or making materials electrically conductive that are not naturally electrically conductive.

2. Description of the Prior Art

With respect to static dissipative materials or materials a providing static dissipative work surface reference is made to prior U.S. Pat. Nos. 4,456,944; 4,525,398, 4,702,951. These patents relate primarily to materials useful for various purposes that provide a static dissipative surface. The materials of these patents provide static dissipative surfaces useful not only as work surfaces but floor surfaces, wall surfaces and various other types of surfaces.

As explained in previous patents, in connection with working with and the handling of many types of electronic components, it is imperatively necessary that static charges in the environment be drained off to ground because otherwise they can have a very deleterious and even destructive effect upon such components. In the present day production of such components many different materials may be used including plastics, rubber, metals, and many, many other types of materials. It therefore becomes highly desirable that all of these materials that might be used in the production of such components and in other types of production be electrically conductive. This has of course not been possible and has not been a capability that has been present in the prior art. What has been available is that which is illustrated in the prior patents referred to. Thus it has become highly desirable as an achievement that materials that are not naturally electrically conductive be made conductive or that materials that are electrically conductive have their electrical conductivity increased or enhanced.

The herein invention embraces exemplary embodiments which are disclosed in detail and which relate to method and apparatus for achieving the purpose of making materials electrically conductive that are not naturally electrically conductive and/or increasing or enhancing the electrical conductivity of materials that do naturally possess electrical conductivity.

SUMMARY OF THE INVENTION

The invention includes a preferred apparatus by which the process can be performed and a preferred form of the process itself. Included also is a preferred form of ultrasonic sound generator which is part of the apparatus and which is used in the performance of the steps of the process or method.

As indicated in the foregoing, the purpose of the invention is to produce electrical conductivity in materials that are not naturally electrically conductive or to increase or enhance the electrical conductivity of materials that are naturally conductive. This purpose is achieved by way of the process or method of the invention.

The method is carried out or executed in a preferred form of apparatus. The apparatus is in the form of a vessel or a tank containing a liquid solution, bath or medium. The vessel might be of any shape but in the preferred form of the invention disclosed herein, it is rectangular. The solution or bath is preferably a liquid which may be simply water that has been filtered to remove iron. Essentially the water has been deionized or distilled water may be used. The filter may be a known type of carbon filter. Removing the iron deionizes the water sufficiently for the purpose of the method.

Chemical ingredients are introduced into the water and mixed into it. The chemicals include acids which provide a vehicle for electrical current which is passed through the liquid bath and which passes through the molecular structure of the materials introduced into the liquid bath which are to be made electrically conductive or to have their electrical conductivity increased or enhanced. The chemical ingredients are caused to intrude into the molecular structure which is loosened by the process as explained more in detail hereinafter. With the aid of ultrasonic vibrations which are passed through the liquid bath, the molecular structure, after being loosened, closes in or comes back at the termination of the processing resulting in a homogenous material which is electrically conductive or possesses increased electrical conductivity.

The chemical ingredients are mixed into the liquid bath simply by stirring and preferably this is done with the liquid bath, that is, the water, heated to substantially 80° F., which causes the chemicals to mix faster while stirring. The ingredients introduced into the liquid include a surfactant in an amount of 5% to 15% for example, by weight. Preferably the surfactant is a liquid. It is a non-ionized surfactant liquid. This surfactant is a product that is used to make soap with. Other surfactants are commercially available that might be used including the product known by the trade name "MAZOX CAPA". The surfactant is a salt. The precise surfactant used is not critical. There is also added muriatic acid in a range of substantially 5–15% by weight. This acid is essentially the same as hydrochloric acid. There is also added substantially ½ of 1% of silver nitrate by weight. Preferably the silver nitrate is in the form of silver nitrate crystals. This product is commercially available. This is a product that may be used in certain photographic processes. During the process the liquid bath or solution is continually circulated and filtered by circulating means provided in association with the said vessel or tank.

The apparatus in which or by which the process is executed includes a plurality of electrodes at opposite positions with respect to the vessel, the electrodes being exposed to the liquid so as to cause an alternating electrical current to traverse through the liquid solution and through the materials being processed. Preferably the electrodes include a plurality of pairs of electrodes that all have an alternating voltage impressed between them which may be preferably in the range of 60–120 volts or on the other hand it is possible that the applied voltage may run as high as 800 volts AC depending on the materials to be processed particularly their density and the desired conductivity to be realized.

Additionally, the apparatus includes a plurality of ultrasonic sound generators arranged in positions opposite to each other to cause ultrasonic vibrations to traverse through the liquid solution and the materials in the solution to be processed. The ultrasonic generators may simply be arranged at opposite sides of the vessel, that is, opposite sides of the rectangular tank when it has that configuration. A preferred form of ultrasonic generator is provided for purposes of practicing the invention although commercially available types of ultrasonic generators might be used.

The preferred form of ultrasonic generator is constructed of tubular parts preferably in a U-shaped configuration. The ultrasonic generator as stated herein is preferably formed of tubular parts connected together by elbows. The tubular parts are filled with barium titanate or on the other hand they may be filled with quartz crystals. Electrodes are provided at the ends of the legs of the U-shaped configuration and a voltage supplied in a range of 60–120 volts AC. Because of the configuration of the parts, ultrasonic vibrations are dispersed in all directions as a result of the reversing flow of the alternating current. Within each unit, disposed within the barium titanate or the quartz crystals is a coil of wire the ends of which are not connected to the electrodes at the ends of the legs of the unit. The purpose of the coil of wire is to facilitate or enhance the flow of current through the material in the ultrasonic unit. The ultrasonic unit could be said to be a form of sound oscillator. The same voltage is applied to all of the plurality of ultrasonic generators in a configuration as referred to in the foregoing. The range of frequencies in the preferred form of the process might be from 40,000 to 280,000.

In performing the process the material to be treated is preferably immersed in the solution. The electrodes as described are energized with the AC voltage to cause current to traverse the solution and the materials being processed and simultaneously the ultrasonic generators are energized to provide for a traversal of ultrasonic vibrations through the solution and the material being processed.

The process is applicable to increasing the conductivity of many, many different materials including such materials as rubber, canvas (tennis shoes), vinyls, high-pressure laminate, synthetic carpeting and other materials as identified more in detail hereinafter. Other materials include metals, such as brass, copper, steel, concrete, polycarbonate, acrylic, styrene, polypropylene, polyethylene, leather, styrene, and others.

The primary object of the invention is to realize the capability of making materials electrically conductive that are not naturally electrically conductive and/or to increase or enhance the electrical conductivity of materials that naturally possess electrical conductivity.

A further object is to provide a method of achieving the foregoing object or purpose.

A further object is to realize the stated objective by way of a method which includes the provision of apparatus and/or materials for practicing the method.

A further object is to realize a method for the stated purpose which includes immersion of the material to be treated in a solution or bath of liquid containing ingredients in the form of chemicals which provide a vehicle for carrying electrical current; providing for a flow of electrical current through the bath or solution and through the material being processed and simultaneously providing for transmission of ultrasonic vibrations through the liquid solution and the material being processed; and causing the molecular structure of the material being processed to be loosened to allow the chemicals to be introduced into the molecular structure and after terminating the process, allowing or causing the molecular structure to reclose or come back together making the material being processed into a homogenous electrically conductive material or material with increased electrical conductivity.

A further object is to provide and realize the process as set forth.

A further object is to realize a process as in the foregoing, wherein the voltage applied to the electrodes producing the alternating current flow is in the range of 60–120 volts A.C., and the voltage applied to the ultrasonic generators is in the range of 60–120 volts A.C., the voltages for producing current flow and for producing ultrasonic vibrations being applied simultaneously, causing them to produce the effects described of loosening the molecular structure of the material being processed so as to introduce the chemicals into the molecular structure and to allow the molecular structure to reclose or come back to the original state.

A further object of the invention is to provide apparatus as identified in the foregoing in or on which the process can be effectively processed.

A further object is to realize apparatus as identified in the foregoing in the form of a vessel containing a solution with chemical ingredients as identified in the foregoing, with electrodes oppositely positioned with respect to the vessel of solution, with means for applying a voltage to provide an alternating current flow through the solution, and the vessel having oppositely disposed a plurality of ultrasonic generators whereby to provide for simultaneous traversal of ultrasonic vibrations through the solution and the material being processed.

A further object is to provide and make available an improved form of ultrasonic sound or vibration generator having a unique configuration to provide the capability of dispersing sound vibrations in all directions.

A further object is to provide or make available a form of ultrasonic sound generator formed of tubular parts, preferably in a U-shape, the unit containing barium titanate or, alternatively, quartz crystals, with an alternating current voltage being applied to the unit so as to pass through the material in the unit, and the material in the unit having a coil of wire disposed in it to facilitate or enhance the flow of alternating current through the material.

Further objects and additional advantages of the invention will become apparent from the following detailed description and the annexed drawings.

DESCRIPTION OF A PREFERRED EMBODIMENT OF THE METHOD AND BEST MODE AND A PREFERRED FORM OF APPARATUS IN WHICH THE METHOD MAY BE PRACTICED

Figure 1:
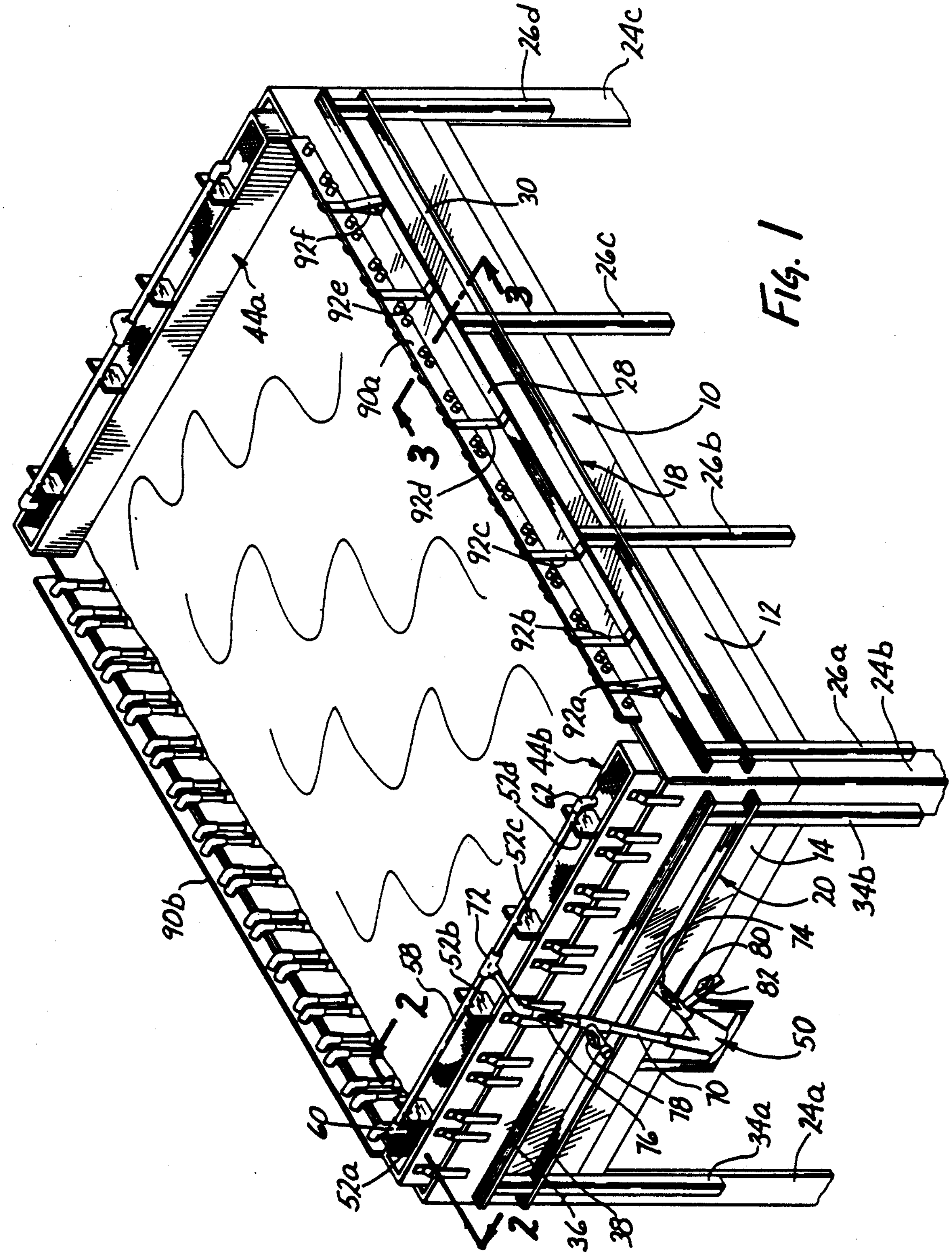
FIG. 1 is an isometric view of a preferred form of the apparatus, illustrating the tank or vessel, the electrodes for providing for flow of alternating currents, and the array of ultrasonic generators.
Figure 2:
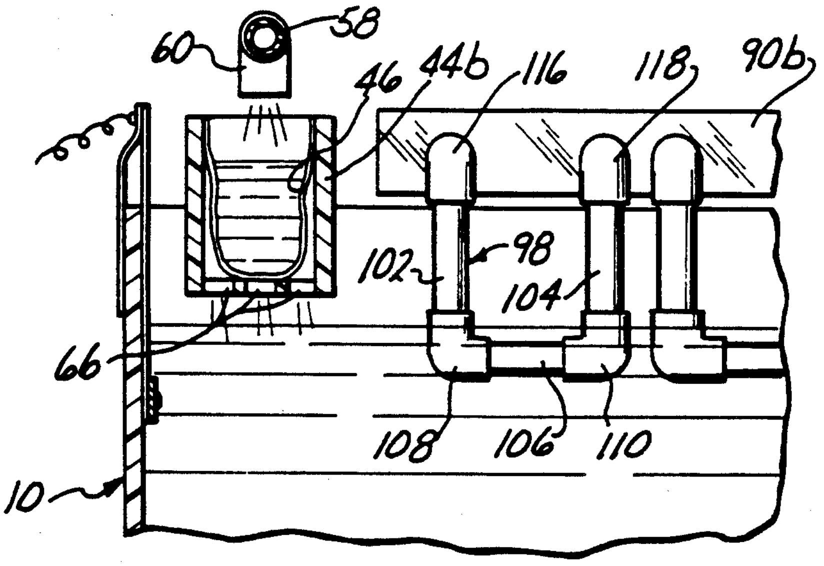
FIG. 2 is a cross-sectional view taken along the line 2—2 of FIG. 1.
Figure 3:
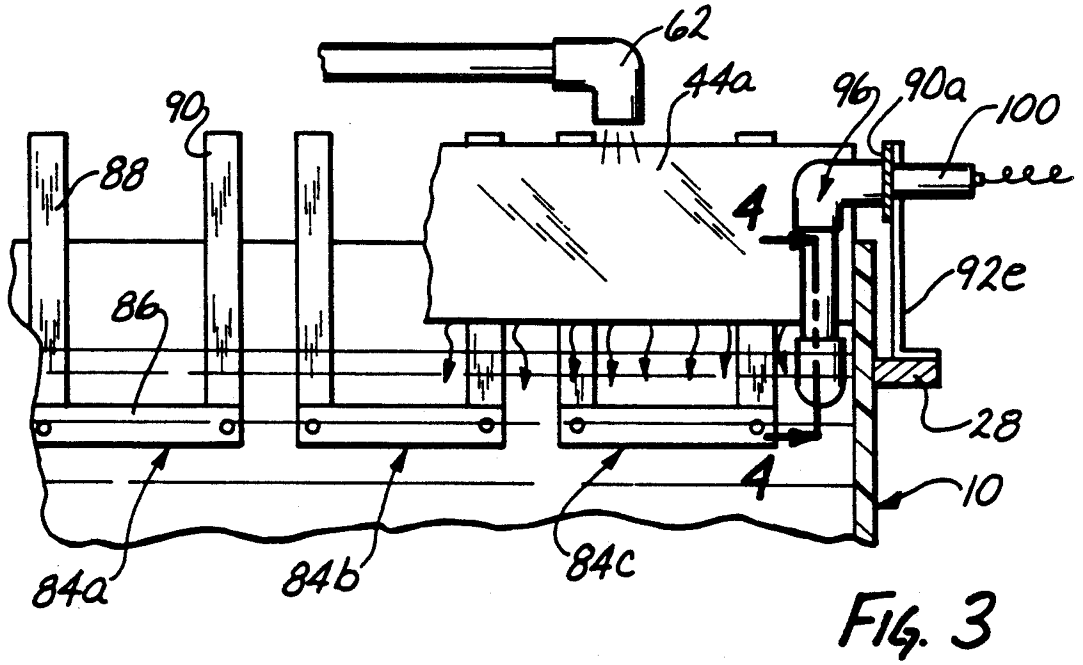
FIG. 3 is a cross-sectional view taken along the line 3—3 of FIG. 1.

Referring to FIGS. 1, 2 and 3 of the drawings, numeral 10 designates generally a vessel which is a rectangular tank for containing the processing solution or bath. The walls of the vessel are formed from plastic sheets of materials, including a side wall 12 and an end wall 14. The sides of the vessel are exactly alike, as are the ends of the vessel. Numeral 18 designates a framework structure which may be made of metal to provide support for the wall 12. Numeral 20 designates a similar supporting framework for the end wall 14. Similar supporting frameworks are provided at the other side of the tank and at the other end.

Supporting legs are provided for the tank itself, as shown at 24*a*, 24*b* and 24*c*. The supporting framework 18 has legs or uprights as designated at 26*a*, 26*b*, 26*c* and 26*d*. Numerals 28 and 30 designate elongated side members at the upper ends of the legs 26.

The end frame 20 has similar legs 34*a* and 34*b*. This framework has transverse members at the upper ends of the legs, as designated at 36 and 38. As previously indicated, the structure at both sides of the tank and the structures at the ends of the tank are alike.

At one end of the tank is a trough, as designated at 44*a*, and at the other end is a similar trough 44*b*. The trough 44*a* may be seen in FIG. 3, and the trough 44*b* may be seen in FIG. 2, these troughs having bottom and side walls as shown and being identical in construction. Within the tank 44*b* is a wire-mesh screen forming a filter, as designated at 46, and within the tank 44*a* is a similar screen. The tank 44*b* and the filtering screen 46 are shown in cross-section in FIG. 2. As previously stated, the structure at the two ends is identical.

Apparatus is provided for producing a continuous circulation and filtering of the solution within the tank. The circulating means at one end includes a circulating pump, as designated at 50 in FIG. 1. Positioned at the top of the tank 44*b* are brackets 52*a*, 52*b*, 52*c* and 52*d*, each having a notch at the top edge. Held in the notches is a distributing pipe or header 58 having elbows at its ends, as designated at 60 and 62, positioned to allow solution to flow out of the ends into the trough 44*b* through the wire mesh filtering screen 46. Preferably, the tube 58 has perforations in its underside to allow the liquid solution to drain down into the trough 44*b*, as illustrated in FIG. 2. The trough 44*b* has openings at the bottom, as illustrated at 66, to allow the solution to drain back down into the tank. See FIG. 3.

The circulating pump connects by a tubular line 70 to a "T" fitting 72 in the pipe or tube 58 for conveying solution to the distributing tube. The pump draws solution from the bottom of the tank through pipe connection 74. Numerals 76, 78, 80 and 82 designate manual valves for manually controlling the flow of circulating solution and for draining solution from the tank, if desired.

Electrical apparatus, including electrodes, are provided at the ends of the tank so that an alternating voltage can be applied to cause alternating current to traverse through the solution in the tank and the material being processed. FIG. 3 illustrates the electrodes at one end of the tank. The structure is the same at both ends of the tanks. Three of the electrode units are indicated in FIG. 3 at 84*a*, 84*b* and 84*c*. Each of these electrode units is of similar construction including a bottom part, as shown at 86, and upright connector or contact parts 88 and 90. Voltage is applied by way of electrical connections to the upper ends of the connector or contact parts 88 and 90. An alternating current voltage of 60–120 volts, by way of example, is applied between the electrodes, although at times, this voltage may be raised to as much as 800 volts, depending upon the density and other characteristics of the materials being processed and the particular degree of electrical conductivity that may be desired.

The parts 84*a*, 84*b* and 84*c* extend or are positioned to be in contact with the solution in the vessel or tank. The electrode array is the same at both ends so that the alternating current is caused to traverse through the solution and through the material being processed. As stated, the structure at both ends of the vessel or tank is the same as is the structure at both sides of the tank.

Figure 5:
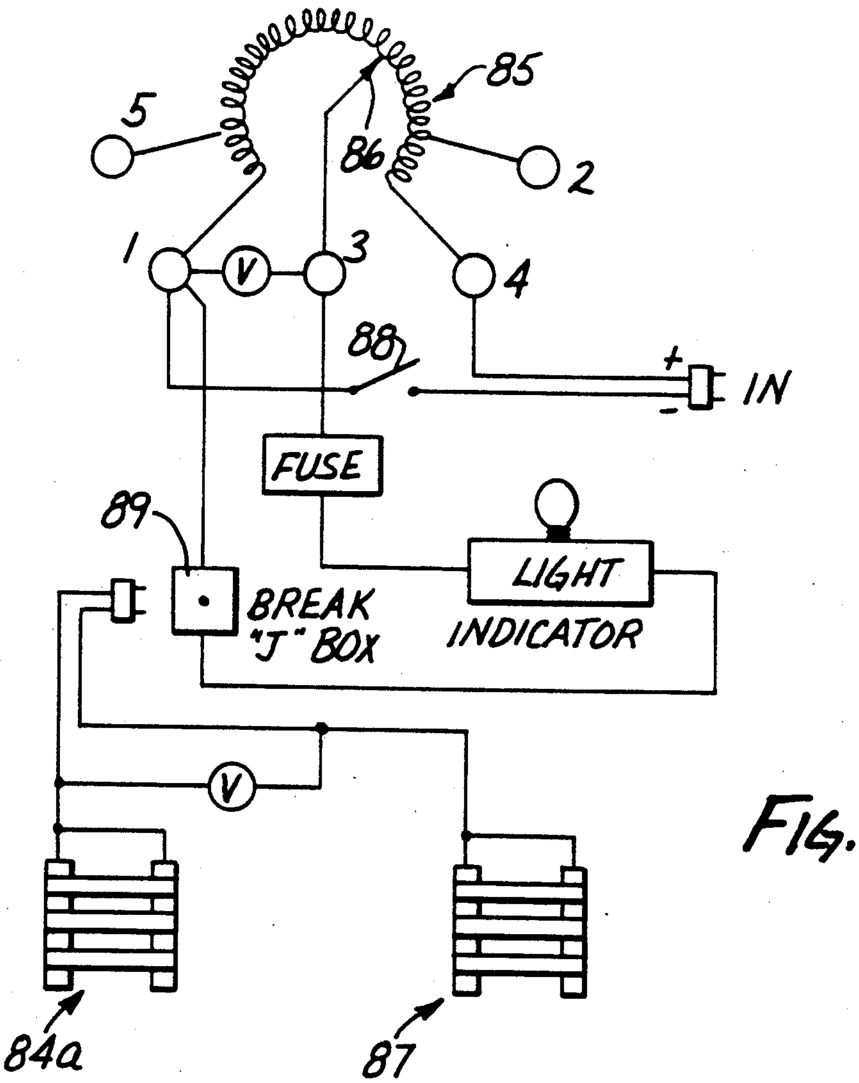
FIG. 5 is a schematic circuit diagram of the circuit for the electrodes that produce the electric field.

FIG. 5 shows the electrical circuitry for applying the voltage to the electrodes at opposite ends of the tank. Numeral 85 designates a variable transformer which is provided for purposes of controlling the alternating current voltage that is applied to the electrodes. The figure also shows the circuitry for providing voltage to the ultrasonic generators, as further shown in FIG. 6.

The numeral 85 designates the secondary of the variable transformer which is connected to the power supply as shown. The power supply is connected to terminals 1 and 4 at the ends of the secondary 85. A slider 86 is provided which can be adjusted along the secondary 85. The parts of the secondary on different sides of the slider are designated at 2 and 4. The slider is connected to terminal 3. The letter "V" designates volt meters connected to the circuit. Numeral 88 designates a control switch.

Numeral 3 is connected through a fuse as shown and an indicator light to the terminal box or "J" box 89. A plug-in connector as shown connects the "J" box to the electrodes as shown at 84*a* and 87, which are electrodes at opposite ends of the vessel containing the solution. Plural electrodes at each end may of course be connected in parallel.

The meter connected between terminals 1 and 3 gives the voltage applied to the circuit as referred to hereinafter, and the voltage across the lines connecting to the terminals 84*a* and 87 indicates the voltage applied across the length of the solution in the vessel.

A circuit similar to or like that of FIG. 5 is used to provide the voltage to each of the ultrasonic generators, such as indicated at 98, all of which can be connected in parallel.

In addition to the electrical apparatus for providing an alternating current to produce a flow of current through the solution in the tank, arrays of ultrasonic sound or vibration generators are provided to produce ultrasonic vibrations that traverse through the solution in the tank and through the material being processed. Referring to FIG. 1 of the drawings, numeral 90 designates a transverse member which supports the ultrasonic units and the electrodes by which electrical power is supplied to the individual ultrasonic units. The member 90 is supported by upright bracket members 92*a*, 92*b*, 92*c*, 92*d*, 92*e* and 92*f* from the elongated member 28, previously described. Numeral 90*b* designates a similar support member at the other side of the tank, showing the upper ends of the individual ultrasonic units supported from the member 90*b*. One of the ultrasonic units is designated at 96 in FIG. 3, this figure showing one of the electrodes 100 connecting to the ultrasonic unit.

Figure 4:
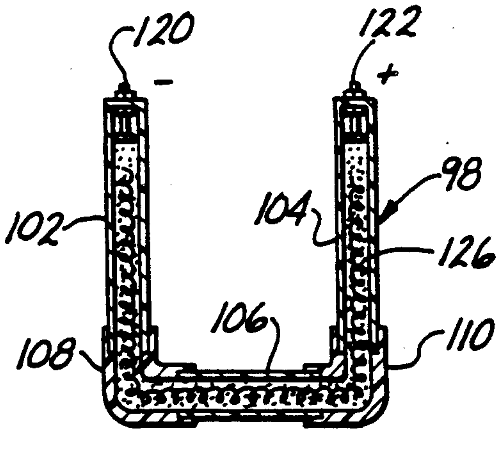
FIG. 4 is a schematic or diagrammatic view of a preferred form of ultrasonic vibration generator.

FIG. 2 shows another of the ultrasonic units, as designated at 98, these units being of course identical in construction. FIG. 4 is a schematic view of a preferred form of ultrasonic unit, identified by the numeral 98.

Figure 6:
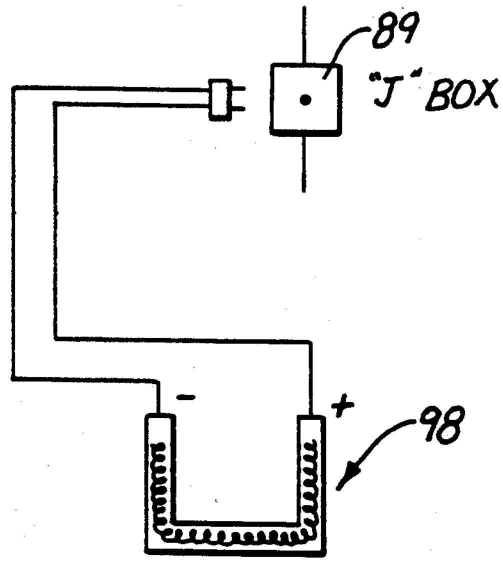
FIG. 6 is a schematic circuit diagram of the circuit for each individual sonic generator.

The unit 98 is constructed of tubular parts, as designated at 102, 104 and 106, the parts including the upright legs 102 and 104 and the transverse lower part 106 which is joined to the upright parts by way of elbows 108 and 110. As may be seen in FIG. 2, elbows preferably are provided at the upper ends of the tubular parts 102 and 104, as designated at 116 and 118. Electrodes are provided at the upper ends of the parts 102 and 104, as designated at 120 and 122, the alternating current voltage being applied to these electrodes. A variable transformer is provided for controlling the voltage supplied to these electrodes. FIGS. 5 and 6 illustrate preferred circuitry for the ultrasonic generators.

The tubular parts of the ultrasonic generator are filled with material which may preferably be barium titanate or, alternatively, quartz crystals. These materials are commercially available materials for the purpose of generating ultrasonic vibrations when a current is passed through them. Disposed within the material is an electrical coil, as designated at 126, the ends of which are not connected to the electrodes 120 and 122. The purpose of the electrical coil is to facilitate the flow of current through the material in the tubular parts. The construction of the ultrasonic generator is unique in that due to its configuration, it has the capability of transmitting and dispersing sound vibrations in all directions through the solution, the ultrasonic generators of course being exposed to the solution within the tank or vessel 10. The construction of all of the individual ultrasonic generators is the same. The generators are arranged or arrayed as illustrated in FIG. 1 at opposite sides of the tank or vessel to provide for the dispersion and transmission of the ultrasonic vibrations through the solution tank and through the material being processed. A preferable range of frequencies generated by the ultrasonic generators may be from 40,000 to 280,000 cycles.

Referring to the solution or bath that is used in the processing tank, preferably it is a water solution of water that has been filtered or distilled water. The water is filtered to remove the iron from the water through a carbon filter of a type that is commercially available. The removal of iron from the water deionizes the water sufficiently for purposes of the process. Distilled water may be used. Certain ingredients or chemicals are introduced into the water, that is, mixed into it, by simple mixing. Preferably, however, the mixing is done with the water heated to substantially 80° F. which causes the chemicals to mix faster while being stirred.

Surfactant is introduced into, that is, mixed into, the water, and this ingredient may be in a range from about 5% to about 15% by weight, depending upon how much increase of conductivity is wanted or needed in the material being processed. The surfactant is a liquid. It is a non-ionized surfactant liquid. This is a product that is used to make soap with. The surfactant may be a product marketed under the trade name "MAZOX CAPA". Other surfactants may be used, which are surfactants that are commercially available. The particular surfactant used is not critical. The surfactant is a salt. Also, there is mixed into the solution muriatic acid in an amount from 5% to 15% by weight. This acid is the same as hydrochloric acid. The ingredients can be mixed in by stirring with a paddle, the actual acts of mixing not being critical. There is added ½ of 1% to 1% substantially of silver nitrate by weight. The silver nitrate is in the form of crystals. This is a product that is commercially available. The effect of the solution during the process with the other steps will be referred to more in detail presently.

As has been pointed out above, there is a continuous circulation and filtering of solution within the tank or vessel by way of the circulating pump at each end.

The following is a description of the process. This description constitutes a specific example of the process, the specific example including the particular equipment or apparatus that has been described in the foregoing.

In carrying out the process, the solution may be that described in the foregoing. In performing the process, the voltage as described is provided through the circuitry described to the electrodes at opposite ends of the tank. To identify a specific example, the data are as follows:

material - vinyl sheet
surfactant 15% by weight
muriatic acid 15% by weight
silver nitrate 15% by weight
voltage (for current) 107 volts A.C.
voltage (for ultrasonics) 110 volts A.C.

The alternating voltage provides for a flow of alternating current through the solution in the vessel and through the materials being processed. Simultaneously, the voltage as described above is applied to all of the individual ultrasonic generators at opposite sides of the tank so as to provide for sonic vibrations to traverse through the solution in the tank and through the material (vinyl) being processed at frequencies as have been indicated, that is, in the range of 40,000 to 280,000. A typical frequency of the ultrasonic vibrations is 60,000 cycles; for example, the material is a rectangular sheet of vinyl material, such as a vinyl, which is placed in the tank and immersed in the solution. The material may be any material or piece of material that is immersible in the solution. The exemplary piece of material being processed is a sheet of laminate having a thickness of, for example, 0.040". The material can be immersed in the solution one sheet at a time, or it is possible to process a large number of sheets at one time with spacers placed in between the sheets of material. Various types of handling equipment can be provided for placing material, such as, for example, sheets of laminate, into the solution in the tank and providing spacers between the sheets. Such equipment, that is, handling equipment, is of course auxiliary to the method, and the equipment or apparatus for practicing the method.

In the process, the flow of alternating current and the sonic vibrations loosen the molecular structure of the material being processed so that the chemicals are carried into and through the material into the molecular structure, making the material electrically conductive or enhancing the electrical conductivity. The surfactant and silver nitrate are conductive materials which are caused by the current and the vibrations to intrude directly into the molecular structure. When the process is terminated and the ultrasonic generators are turned off, the molecular structure then closes or comes back together again, resulting in the material being processed being a homogeneous conductive material or electrically conductive material that has had its conductivity increased or enhanced. A number of different types of material have been . successfully processed by the process, including rubber and canvas (that is, tennis shoes), and also vinyls, synthetic carpeting and other materials.

In observing the process and its effect, there has been used a surface resistivity meter, that is, Model 262A marketed by Monroe Electronics, Inc. This instrument is capable of testing the surface resistance of sheets of material and also the resistance to ground of pieces of material that have been processed. The resistivity meter is an instrument with parallel electrodes at the bottom which are placed in contact with the material to be tested, the instrument giving a reading of the electrical resistivity of the area encompassed between the electrodes. A reading can be had as to the resistivity per square, that is, the area between the electrodes and/or the resistance to ground. By way of example, an unprocessed material may show a resistance of $10^{12}$ or $10^{13}$ ohms. After processing, by way of example of one material processed, the reading of the ohms resistance went down from these figures to $10^6$ and $10^7$. The resistivity in ohms is of course an indication of the increase in electrical conductivity of the material processed. The electrical conductivity can be increased or enhanced to a greater extent by leaving the material to be processed in longer and by increasing the voltage and the frequency of the. vibrations generated by the ultrasonic generators.

From the foregoing, those skilled in the art will understand and comprehend the nature of the method and the equipment or apparatus with which the method can be successfully practiced. The disclosure herein is representative of a preferred exemplary type of equipment and apparatus and a preferred exemplary form of the method. The disclosure herein is intended to be representative of the exemplary form of the invention and is to be interpreted in an illustrative rather than a limiting sense, the invention to be accorded the full scope of the claims appended hereto.

What is claimed is:

1. A method of making materials electrically conductive or increasing the electrical conductivity of materials comprising, in combination:
  preparing a bath of liquid having dissolved in it ingredients making the liquid electrically conductive;
  immersing the material to be treated in the said liquid bath;
  causing an alternating electric current to pass through the said liquid bath and the material and simultaneously subjecting the said liquid bath and the material to ultrasonic vibrations whereby the molecular structure of the said material is loosened to cause the current to carry the said ingredients into and through the material to be treated, whereby the material is made electrically conductive or its electrical conductivity is increased.

2. A method as in claim 1, including the steps of causing the electrical current to traverse laterally through the liquid bath and applying the said ultrasonic vibrations to traverse laterally through the liquid bath.

3. A method as in claim 1, including the step of introducing salts into the liquid bath in order to make the liquid electrically conductive.

4. A method as in claim 3, including a salt which is a surfactant, introducing into the liquid bath muriatic acid, and introducing into the liquid bath a small percentage by weight of silver nitrate crystals.

5. A method as in claim 4, wherein the surfactant is introduced in a range of substantially 5 to 15% by weight, the muriatic acid is in a range of 5 to 15% by weight, and introducing the silver nitrate crystals in an amount of substantially ½ of 1% to 1% by weight.

6. A method as in claim 1, wherein the ultrasonic vibrations are applied at a frequency in the range of 40,000 cycles per second to 280,000 cycles per second.

7. A method as in claim 1, wherein the voltage applied to cause current to traverse through the bath is an alternating current voltage in the range of 60–120 volts AC.

8. An apparatus for carrying out a process for making a material electrically conductive or for increasing its electrical conductivity comprising, in combination:
  a vessel adapted to contain an electrically conductive liquid;
  electrodes positioned with respect to the vessel so as to be exposed to the liquid and to have an alternating current voltage applied to the electrodes in a position and manner to cause an electric current to traverse liquid in the vessel;
  a plurality of ultrasonic generators positioned with respect to the vessel, whereby to cause ultrasonic vibrations at a predetermined frequency to traverse through the liquid at the same time that the electric current traverses through the liquid, the electrically conductive liquid being water having in it ingredients having the capability that when the material is subjected to the alternating current and the ultrasonic vibrations of loosening the molecular structure of the material, whereby the ingredients intrude into the material, and to cause the molecular structure to come back together after termination of the process, causing the material to become electrically conductive or to have its electrical conductivity increased if it is naturally electrically conductive.

9. An apparatus as in claim 8, including means for continuously circulating liquid in the vessel.

10. An apparatus as in claim 8, wherein each individual ultrasonic generator is constructed to have a configuration whereby to disperse vibrations in all directions from the unit.

11. An apparatus as in claim 8, wherein the vessel is of a generally rectangular construction having ends and having sides, the said vessel having electrodes at opposite ends exposed to the liquid for causing current to traverse the liquid, the said vessel having ultrasonic generators at opposite sides of the vessel whereby to transmit ultrasonic vibrations between the sides of the vessel.

12. An apparatus as in claim 8, wherein the ingredients introduced into the liquid include a surfactant, acid, and silver nitrate crystals.

13. An apparatus as in claim 12, wherein the surfactant is introduced in a range of 5% to 15% by weight, the acid is muriatic acid in a range of 5% to 15% by weight, and the silver nitrate is substantially ½ of 1% to 1% by weight of the total weight of the liquid.

14. An apparatus as in claim 13, wherein the ultrasonic vibrations are generated in a range of 40,000 to 280,000 cycles per second.

15. An apparatus as in claim 8, wherein each ultrasonic generator is constructed in a configuration having the capability of dispersing vibrations in all directions.

16. An apparatus as in claim 15, wherein each ultrasonic generator has tubular parts containing barium titanate, the generator having electrodes for the application of alternating current voltage, and there being a coil of wire disposed within the barium titanate, the ends of the coil being spaced from the electrodes of the unit.

17. An apparatus as in claim 15, wherein the material contained within each ultrasonic generator is in the form of quartz crystals.

18. An ultrasonic sound generator comprising, in combination:

a body containing crystals and having electrodes for the application of voltage, whereby to cause a current to traverse through the crystals for generating ultrasonic vibrations;

means for applying an AC voltage to the electrodes, the said body being constructed at least in part to be circular in cross-section, whereby to cause ultrasonic vibrations to be dispersed outwardly in all directions from the sides of the part.

19. A generator as in claim 18, wherein the said crystals are barium titanate.

20. A generator as in claim 18, wherein the generator is of generally U-shaped construction, the generator having parts that are tubular, with electrodes positioned at ends of the tubular parts.

21. A generator as in claim 18, having a current conductive member positioned within the crystals, whereby to enhance the flow of current through the conducting member and through the crystals, the said member being free from electrical connection to the electrodes.

22. A generator as in claim 21, wherein the voltage-applying means applies voltage in the range of 4,000 to 280,000 Hertz.

23. A generator as in claim 21, wherein the generator is of generally U-shaped construction having tubular parts, the electrodes being at ends of tubular parts.

24. In an apparatus for making a material electrically conductive or for increasing its electrical conductivity, wherein the apparatus includes a vessel containing an electrically conductive liquid, there being electrodes positioned to produce an alternating current electric field through the liquid, and ultrasonic sound generator means for producing ultrasonic vibrations to traverse through the liquid; the electrically conductive liquid being water having in it ingredients having the capability that when material being treated is subjected to the alternating current and the ultrasonic vibrations, the molecular structure of the material is loosened, whereby the said ingredients intrude into the material and cause the molecular structure to come back together after termination of the treatment, causing the material to become electrically conductive or to have its electrical conductivity increased if it is naturally electrically conductive.

25. The substance of claim 24, wherein the ingredients in the liquid include a surfactant, acid and silver nitrate crystals.

26. The substance of claim 25, wherein the surfactant is in a range of 5% to 15% by weight, the acid is a muriatic acid in a range of 5% to 15% by weight, and the silver nitrate is in a range of substantially 0.5% to 1% by weight of the total weight of the liquid.

27. The substance as in claim 26, wherein the ultrasonic generator means includes a generator having tubular parts containing barium titanate, the said generator having electrodes for the application of alternating current voltage, and there being a coil of wire disposed within the barium titanate, the ends of the coil being spaced from the electrodes of the unit.

28. The substance of claim 24, wherein the ultrasonic vibrations are generated in a range of 40,000 to 280,000 cycles per second.

29. In a system for making a material electrically conductive or for increasing its electrical conductivity, an electrically conductive liquid having in it ingredients having the capability that when the liquid and material are subjected to alternating current and ultrasonic vibrations, the molecular structure of the material is loosened, whereby the said ingredients intrude into the material and cause the molecular structure to come back together after termination of the treatment, causing the material to become electrically conductive or to have its electrical conductivity increased if it is naturally electrically conductive.

30. The substance of claim 29, wherein the ingredients in the liquid include a surfactant, acid and silver nitrate crystals.

31. The substance of claim 30, wherein the surfactant is in a range of 5% to 15% by weight, the acid is a muriatic acid in a range of 5% to 15% by weight, and the silver nitrate is in a range of substantially 0.5% to 1% by weight.

32. The substance of claim 31, including sources of alternating current field and ultrasonic vibrations for acting on the liquid and material.

* * * * *